United States Patent [19]
Bock et al.

[11] Patent Number: 5,179,587
[45] Date of Patent: Jan. 12, 1993

[54] DIGITAL TELECOMMUNICATIONS EXCHANGE SYSTEM

[75] Inventors: Hans-Jurgen Bock, Darmstadt; Herbert Dobold, Cologne, both of Fed. Rep. of Germany

[73] Assignee: Telenorma GmbH, Fed. Rep. of Germany

[21] Appl. No.: 507,622

[22] Filed: Apr. 10, 1990

[30] Foreign Application Priority Data

Apr. 13, 1989 [DE] Fed. Rep. of Germany ....... 3912078

[51] Int. Cl.$^5$ .......................................... H04M 11/00
[52] U.S. Cl. ........................................ 379/95; 379/94
[58] Field of Search ....................... 379/95, 94, 96, 97, 379/98, 93

[56] References Cited

U.S. PATENT DOCUMENTS 4,897,866 1/1990 Majmudar et al. .................... 379/96
4,928,304 5/1990 Sakai ..................................... 379/94

FOREIGN PATENT DOCUMENTS 0266151 5/1988 European Pat. Off. .

OTHER PUBLICATIONS

PCT Publication WO 88/07314, Oct. 22, 1988.

*Primary Examiner*—James L. Dwyer
*Assistant Examiner*—Stella L. Woo
*Attorney, Agent, or Firm*—Eckert Seamans Cherin & Mellott

[57] ABSTRACT

A telecommunications system operable to connect terminal devices for exchange of data has control devices (ST, GST), an accessory control device (HS), and a memory (SP). The control devices effect addressed connections via hierarchical coupling fields (KF) to which terminal devices (T, PC, VP) and/or transmission lines (VL) are coupled, each by two user channels and one signalling channel. Routine transmissions to and from a telephone apparatus (T), computer (PC) or the like are effected by connection addressing codes transmitted on the signalling channel. For special functions or transmissions, a unique code is inserted in the signalling data, which causes the control device (GST, ST) to pass the signalling data to the accessory control device (HS). The accessory control device replaces the unique code with a connection addressing code if the terminal is authorized, and returns the signalling information to the control device, where it effects the desired connection. The memory (SP) stores data not used in switching, such as "telephone book" listings, usage data, authorizations and the like. When a transmission involves a change in redundantly stored data in the memory and in the terminal device memories, the control devices and/or terminal devices locate and update all occurrences of the data. The system connects special functions to the exchange, without interfering with basic switching functions.

19 Claims, 1 Drawing Sheet

DIGITAL TELECOMMUNICATIONS EXCHANGE SYSTEM

BACKGROUND OF THE INVENTION

1. Field of the Invention

The invention pertains to a digital telecommunications exchange system with a control device including a memory and with a large number of termination circuits for connecting terminal devices via subscriber's lines and line circuits for the connection of communications lines leading to other telecommunications systems. The subscriber's and/or connection lines in each case have at least two user channels for transmission between the termination or line circuit and a coupling device of the telecommunications system, while the information of the data and/or signalling channel is provided for transmission between the connection or line circuit and the control device via a bus system.

2. Prior Art

A telecommunications exchange system is already known, as described in German Patent 34 05 011, including a switching arrangement for operating two-line digital subscriber's and/or connection lines of a telecommunications exchange system. The information on the data and/or signalling channel is transmitted between the connection or line circuit and the control device of the telecommunications exchange system via a bus system. To transmit the useful information, two user channels are available per connecting line with a transmission speed of 64 kbits/second in each case, while the data and/or signalling channel for transmitting communications-technical information has a transmission speed of 16 kbits/second.

The control device of such a telecommunications exchange system serves, among other things, to control the set-up and release of connections and for switching the connection pathways inside a coupling device. Besides other storage devices, the control device has a so-called customer data memory which, for example, contains information on the assignment of call numbers to respective connection addresses, authorizations and other connection-related information. The input of such information into the customer data memory can be done, for example, via a terminal device connected to a termination circuit or also via a data terminal connected to a bus system connecting several decentralized control devices with a control device higher in a subordination hierarchy, as is described for example, in German Patent 34 44 649.

Another possibility for inputting information into the customer data memory involves sharing a common service computer in a network formed by a large number of telecommunication exchanges The common computer has access via the signalling channel to the customer data memories of the individual telecommunication exchanges. Such a service computer is described, for example, in German Patent 21 39 275 or in the book *Betriebsmessungen der Fernmeldtechnik, Teil 2: Vermittlungstechnik* ("Operational Measurements of Telecommunications Engineering, Part 2: Telephone Switching Engineering"), Fachverlag Schiele und Schon, GmbH, Berlin 1976, on pages 360 and 361.

It would be desirable to provide a digital telecommunications exchange system of this type, wherein changes to customer data memory are facilitated, and in addition, other performance features are included. However, such capabilities should be consistent with, and should not interfere with, the control structure and operation of the exchange system. According to the present invention a computer with an input keyboard and a monitor is connected on a subscriber's line to the system. The control device of the system has an accessory control device which makes it possible to transmit data between the computer and the control device, so that a change in the data in the memory of the control device can be made by the computer, and/or the transmission of data from the memory to the computer is possible.

In this case, a certain part of the customer data in the memory of the control device may also be in the computer, in which case, for example, a change in the customer data in the computer is made first, and subsequently the change is made in the customer data in the memory of the control device of the telecommunications exchange system. Furthermore, the customer data memory can contain information which is required in the computer only temporarily. This information is called up when needed from the memory of the control device of the telecommunications exchange system by the computer. For example, the computer can function as a telephone book, in which case, besides the customer data, which is also available in the memory of the control device of the telecommunications system, additional information is contained in the computer which has no meaning in terms of telephone switching engineering. Via the accessory control device, it is also possible to initiate, e.g., connections between subscribers or between subscribers and communications lines via the computer.

The connection of computers with a monitor and keyboard to a private automatic branch exchange has already been described in European Patent Publication 266,151. However, here the computers connected to the subscriber's line cannot change customer data in the control device of the private automatic branch exchange nor is it possible to intervene in the switching processes via the hooked-up computer.

Finally, from German Patent Publication 2,120,562 is known a time-multiplex telephone exchange device in which a computer is connected to a control device of the exchange system, the computer supplementing the control device in terms of additional features. In this configuration, no change in customer data memory is possible.

SUMMARY OF THE INVENTION

An object of the invention is to provide a digital telecommunications exchange system of the type mentioned initially with the intention of facilitating changes in the content of the customer data memory, and additionally to provide the communications device with additional performance features without the need of communications-engineering interventions into the control structure and operation of the telecommunications exchange system.

This and other objects are achieved in that a computer with an input keyboard and a monitor is connected on a connection line to the system. The control device of the system has an accessory control device which makes it possible to transmit data between the computer and the control device, so that a change in the data in the memory of the control device can be made by the computer, and/or the transmission of data from the memory to the computer is possible. These features are obtained without interfering with the switching aspects of the exchange system.

An advantageous modification of the invention consists of connecting several computers to the telecommunications exchange system, having the accessory control device contain a table with information on the individual computers and establishing with this information the memory data capable of being changed by a certain computer. With this structure, each computer can perform other functions, e.g., a first computer can perform the task of the "telephone book" and a second computer can perform the toll data recording. Other advantageous modifications of the invention may be derived from the disclosure and claims.

BRIEF DESCRIPTION OF THE DRAWINGS

The invention is explained in detail with reference to an exemplary embodiment which is shown in the drawings, wherein.

DETAILED DESCRIPTION OF THE PREFERRED EMBODIMENTS

Figure 1:
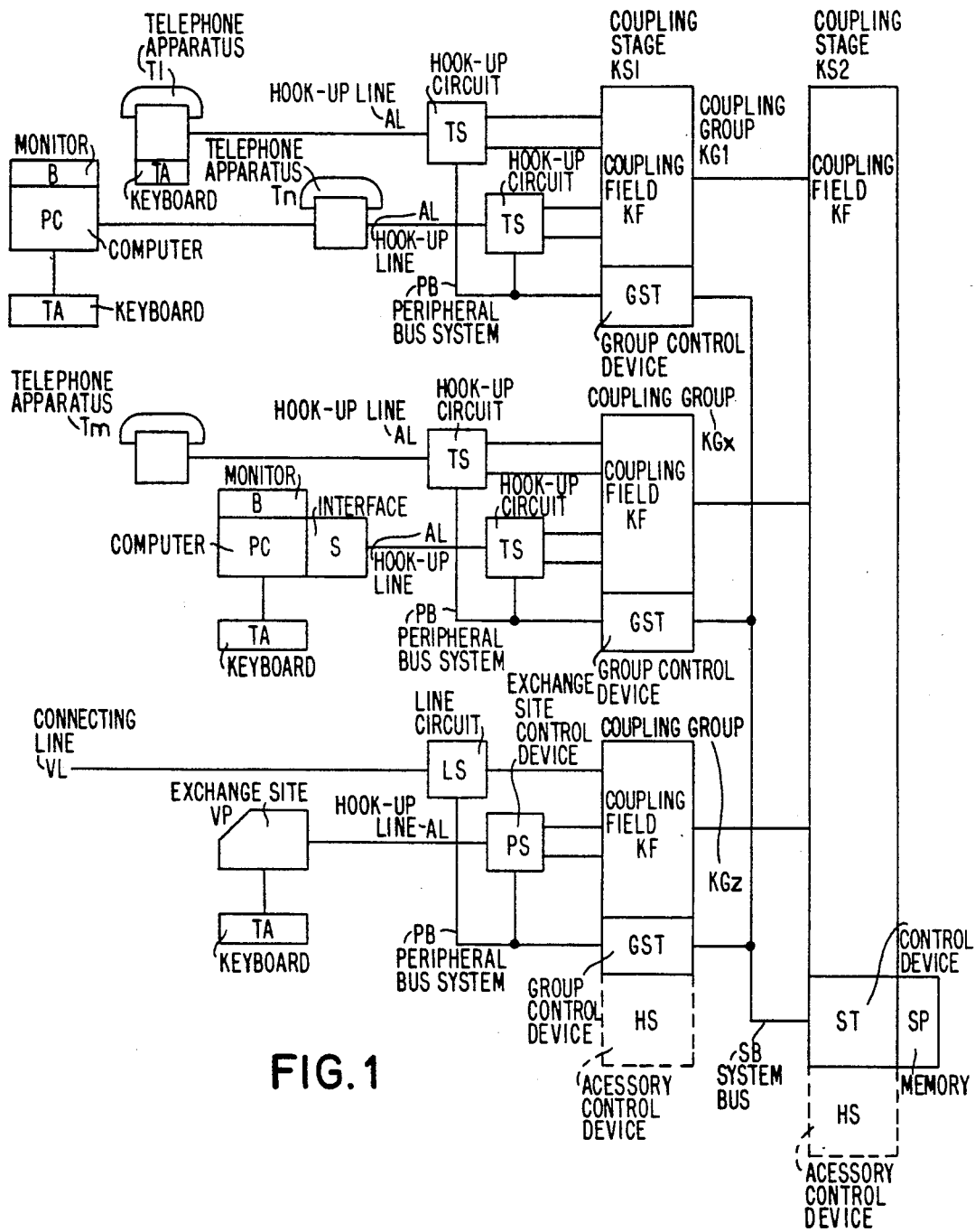
FIG. 1, shows a block diagram of a digital telecommunications exchange system according to the invention; and, FIG. 2, shows the structure of a data word in an item of signalling information.

A digital telecommunications exchange system as shown in FIG. 1 consists of at least one coupling group KG, which has a coupling field KF, to which a large number of subscriber or termination circuits TS and/or line circuits LS are connected. Connections as discussed herein should be construed to include operative connections made directly or through various coupling circuits. A subscriber circuit TS makes an operative connection between the exchange and a subscriber's line with which a telephone apparatus T or an exchange site VP is connected. In this manner the telephone or exchange site can be addressably accessed.

On the subscriber's line AL and possibly also on the connecting line VL, the latter can connect the telecommunications exchange system with another exchange system, two user channels and one data and/or signalling channel are carried. The user channels in each case preferably have a transmission speed of 64 kbits/second and the data and/or signalling channel has a transmission speed of 16 kbits/second. In the subscriber circuit TS, in the exchange site control device PS and possibly also in the line circuit LS, a plurality of operative devices potentially connectable to the exchange channels can be provided. The subscriber circuits TS, the exchange site control device PS and possibly the line circuit LS, when accessed are in each case connected to the coupling field KF by two lines, one line for carrying the one user channel and the other line for carrying the other user channel.

The data and signalling and addressing information for selectively operating a desired one of the subscriber circuit TS and the exchange site control PS, and possibly also the line circuit LS, is connected at each coupling group to a group control device GST. This signalling and addressing data can be extracted from or added to the information flow on the subscriber's lines AL and the connecting line VL. This information for addressing and signalling between the subscriber circuits TS, the exchange site control PS and/or the line circuit LS, is carried via a peripheral bus system PB which is coupled to the next hierarchical controlling level in the exchange system.

If a plurality of parallel coupling groups KG1, KGx ... KGz are present, then they form the coupling stage KS1. Potential connections within a given coupling group KGn can be made at that coupling group, for example under control of the group control device GST. Potential connections that overlap the coupling groups at stage KS1 are handled via the next level coupling stage KS2. For this purpose, the latter is provided with a coupling field KF which is controlled by its own control device ST. The group control devices GST of the coupling groups KG are connected to one another and to the control device ST via a system bus SB, which carries the telephone exchange switching and signalling information. This switching information for connections within and between coupling groups at stage KS1 is exchanged between the group controls GST of the individual coupling groups KG and the control device ST at the second hierarchical switching level, namely KS2.

As mentioned above, telephone apparatus T1, Tn and Tm are connected to the subscriber's lines AL. Various forms of telephone apparatus can be connected to the exchange. In the illustrated case, telephone apparatus Tn and Tm, for example, may be simple digital telephones, while telephone apparatus T1 may be a so-called multifunction telephone terminal including a keyboard TA. A computer PC with a monitor B and an input keyboard TA is connected to the telephone Tn. This connection can occur via an internal bus system (not shown) of the telephone subscriber station whereby to this bus system additional devices may also be connected. A computer PC also with a monitor B and a keyboard TA is connected directly on the subscriber's line AL to a subscriber circuit TS of another coupling group, namely coupling group KGx, said computer having a special interface S for connection to the subscriber's line AL. The exchange site VP also has a keyboard TA and an indicator (not shown), as may also be the case for the telephone T1.

An accessory control device HS is coupled to at least one of the group control devices GST or the superior control device ST, and can also form part of the control device GST control device ST. The corresponding group control GST or the control device ST has a memory SP which is shown in the drawing at the control device ST only, for purposes of illustration. This memory contains a large amount of data, e.g., customer data respecting all peripheral devices connected to the digital telecommunications exchange and addresses of their respective connections.

The customer data memory in the memory SP may contain, for example, all or parts of the following data, namely data which is required or useful to serve the function of making of addressed connections under control of the control device ST. These are, for example:

hardware address code of terminal device
status of terminal device
nature of terminal device
authorizations
code dialing
collective number
call rerouting
night settings
dialing evaluation
bundle administration blocking mechanism
base data
toll information
telephone number According to the invention the customer data memory in the memory SP can also contain, in addition to the aforesaid class of data useful for effecting switching functions, the data for non-switching functions assisting the subscribers. A "telephone book," the contents of which can be called up and displayed by the terminal devices is preferably included. The data for a telephone book includes, for example, besides the call numbers:

last name, first name
department
cost center
building
room of subscriber in question The information can be stored and accessible, for example, in the form of a database. To supplement this minimal information for the telephone book, for example, additional information can be stored in an accessible manner at one of the computers PC, such as:

main department
organization unit
VIP information

The same or a different computer PC can also contain useful data on the network organization. This includes, for example, call number
room
type of terminal device
distribution data
cable data
state of terminal device The same computer PC or another computer PC can be provided for call data administration. It contains the following data:

call number
personal number
name
project number
cost center
official toll number
private toll amount A comparison of the lists of the individual data given above clearly shows that frequently the same data may be required for different purposes by the different computers PC. If a change to the data is made at one place, it is appropriate to make a matching change in the data at other places. On the one hand, the data in the customer data memory in the memory SP can be amended from a terminal device, e.g., from the telephone apparatus T1 or from the exchange position VP. In this case, the changes are input via the input keyboard TA of the terminal device. Change information is transmitted via the data and/or signalling channel over the subscriber's line AL to the subscriber circuit TS or the the exchange site control PS and from there via the peripheral bus system PB to the corresponding group control GST. The latter passes the data on by the system bus SB and from there to the group control GST or to the next hierarchical control device ST, which is provided with an accessory control device HS. In the accessory control device HS, as described in detail below, the information is identified as involving a data item stored redundantly, thus requiring a corresponding change for the customer data memory. The corresponding change is passed on to the group control GST or to the control device ST and serves there to initiate the corresponding change. In the accessory control device HS, a corresponding table (not shown) is included which, among other things, provides information on what particular data changes made in the customer data memory of the memory SB are to be communicated, and identifies the computer PC wherein the data is redundantly stored. Each computer PC reports on the data and/or signalling channel at regular intervals to the accessory control device HS while it is operational. As soon as a change is made in the customer data memory of the memory SP, it is determined in the accessory control device HS whether this change is to be communicated to a computer PC and if this is the case, to which computer. The accessory control device then causes the change to be sent to the corresponding computer PC.

If the change involves a number of computers PC, the communications for data matching between the other computers in order to relieve the load on the system bus SB can take place via the user channels, in which case the control of making and breaking of connections can be initiated by the accessory control device HS.

Each computer PC in this arrangement is provided with a table in its memory including information on all the computers PC that have corresponding redundant data entries with the table (not shown) in the accessory control device HS. In the case of a change in data at a computer PC, the type of change and the place of the change are registered in this table and the table information is updated at all of the above-named devices. On the basis of this table, the computers PC are therefore themselves capable of undertaking the data communication among one another needed to update all the remote occurrences of an entry which is changed. Where data is changed locally at the computer PC, the set-up and release of connections for addressing and updating the data at other locations is controlled by the computer PC and the exchange of data takes place via one of the two user channels.

In this table, all momentarily active computers PC are noted in the accessory control device HS, the contents of this table being communicated to all computers PC in the case of a change in data.

To relieve the burden on the accessory control device HS, part of the functions of the accessory control device HS described can be transferred into a computer PC which can be identified as the "master" with respect to the other computers PC. If this computer PC is not active, then its "master" function is taken over in turn y the accessory control devices HS or also by another active computer PC.

If the change in the customer data memory in the memory SP is carried out via the input keyboard TA of a multifunction telephone apparatus T1 or the like, then initially the change is entered in the memory (not shown) of the corresponding local computer PC. Then, data matching and/or updating is conducted to update the memory contents of the remote computers PC and the content of the customer data memory in the memory SP in the already described manner. To avoid an anomalous condition of the data in the event that a change in the content of the customer data memory of the memory SP is made by two input keyboards TA simultaneously (i.e., before the change has been communicated to other devices), then the access to the customer data memory can be controlled via the accessory control device to prevent initiation of a new change procedure until a previous change affecting the same data has been completed. This is true for all types of input whether from the terminal or from the computer.

A terminal T or operator's position VP, e.g., accesses the "telephone book" in the customer data memory of the memory SP via the data and/or signalling channel, while access to the expanded telephone book in the computer PC can take place via a user channel, in which case the connection is made in the same manner as in the case of a normal telephone call. The system data can be called up by a telephone apparatus T operating as a service node which is provided with a corresponding identification. This data can be made inaccessible for normal subscriber connections, or for the administration of switching data. For example, only some devices such as the operator's position VP may have access to this data, the information again being carried by a user channel.

Figure 2:

As mentioned above, the telephone switching technical information carried by the data and/or signalling channel is fed via the system bus SB to the corresponding group control device GST or to the next hierarchical control device ST where it serves, for example, to control the set-up and release of addressed connections. The information intended for the accessory control device HS must be especially identified so that it is passed along to its intended destination rather than processed only to the point of the corresponding group control device GST or next level control device ST. The transmission of information on the peripheral bus system PB or the system bus SB can take place in two bit-frames according to the D-channel protocol —CCITT recommendations Q.921 and Q.931 (see TN-Nachrichten 1987, No. 91, pages 41–47). The schematic structure of the preferred frame is shown in FIG. 2. Between flag bits at the beginning and at the end of the frame, a block test symbol sequence BZF, an information field IF, a control field SF and an address field AF are transmitted. The address field contains, among other items, a terminal address which gives an indication of the origin or destination of the information transmitted in the field IF to be written or read, respectively. In addition, the address field AF contains the field SAPI which provides coded information as to the identity of the device in which the transmitted information is to be processed or in which the transmitted information was generated. Telephone switching information coming from a terminal T, PC, VP, or from a connecting line VL is provided at its origin with a corresponding indication code by which it is assured that the information is fed to the group control device GST or to the next level control device ST and processed there. (A table of appropriate codes is shown on page 46 of the reference cited above.). If a change in the customer data memory of the memory SP is initiated at an authorized terminal, then the telephone technical switching codes are not used in the terminal or in the other-end device but instead another predetermined indication code is used so that the transmission is properly interpreted as intended. For example, this can be done by activating a certain key or by automatically setting the appropriate bits during a certain operating state of the terminal or the computer to define a unique code for certain of the transmitted bits.

Because of the unique code associated with a transmission intended for changing the customer data memory, which unique code is detected in the group control device GST or in the next level control device ST, the information is not processed in the usual manner but instead is passed on to the accessory control device HS. Here the information is first analyzed, and it is established initially from which terminal device or computer the information comes. If the corresponding terminal or computer is found to be authorized to make changes, then the special indication code that caused the transmission to flow through or bypass the control devices GST or ST can be removed from the transmitted information by the accessory control device HS and replaced by an indication code which defines the group control GST or control device ST as the processing device or address. This changes the customer data memory accordingly on the basis of the information.

As provided in the table on page 46 of the reference cited "TN Nachrichten", six bits are available for the SAPI information so that a total of $2^6$ or 64 different possible combinations exits. Of these, presently, only a few are utilized. Therefore, one or more code combinations is available for identification of the signalling information for the accessory control device HS which is also used only within an exchange system or within a network formed, for example, of private automatic branch exchanges.

It is conceivable to use a plurality of accessory control devices HS, each such accessory control device HS being operable for a certain task. The selection of the accessory control device HS in each case can be selected on the basis of corresponding programs, code combinations and/or key activations. The SAPI value for procedures for a simple line exchange can be 0 (i.e., all six bit positions in this case are set to 0). This means that in normal operation within the exchange in the case of addressed connections made point to point, all signalling information generated for controlling transmission routing processes via group control device GST or control device ST, or signalling information generated by them, contains the SAPI value 0. Inasmuch as the accessory control device HS is responsive to a certain non-zero SAPI value or values, transmissions with a SAPI value of 0 are merely processed as normal signalling information in the group control GST or control device ST.

The advantage of the process according to the invention, i.e., the use of a special SAPI value for identification of signaling information intended for the accessory control device HS, consists in that this information is first passed through the group control device GST and next level control device ST and can thus be checked in the accessory control device HS and thereafter processed. In the accessory control device HS, this signalling information can be transformed to include the required bit pattern such that after checking by the accessory control device HS the information can be processed in the same manner as all other signalling information by the group control device GST or next level control device ST. In this way, it is also possible to send from the accessory control device HS signalling information to the group control device GST or next level control device ST in order, e.g., as mentioned above, to produce a user channel connection between two computers PC for the purpose of data matching or exchange. For this purpose, e.g., in the accessory control device HS initially a receiver off-hook report is generated, the TEI value of which in the address field AF (see FIG. 2) corresponding to the hook-up address of one computer. Then the dialing address information for effecting an addressed connection with the other computer is transmitted from the accessory control device HS to the group control device GST or to the next level control device ST, after which, as mentioned above, a user channel connection is formed between the two computers for comparing and/or transferring the amended data. It is also possible to produce such connections not only on the initiative of the accessory control device, but also by other authorized terminal devices T, VP, PC. The signalling information for forming a connection is identified by the terminal device with the SAPI value by which the transmission of the signalling information to the accessory control device HS is initiated. There in turn the change of the SAPI value takes place in the prescribed manner, and it is passed on to the group control GST or the control device ST, whereby various controlled functions can be enabled.

The computers PC may be larger computers or personal computers. They have a corresponding programming which, with the aid of an operator's guide on the monitor, facilitates the input of the data to be changed. The description to this point has been based on a digital telecommunications system to which only computer work stations are connected. However, it is also conceivable to have a network of exchange installations which are connected to one another via connecting lines VL. In this case, computers PC need not be connectable or fully functional as to all the telecommunications exchanges in the network; rather, it is sufficient only to authorize such computers PC for certain telecommunications devices or functions in the network. In such a case, a single computer PC can also make the change in the customer data memories of several telecommunications exchanges of the network via connecting lines VL, the processes taking place in the manner described above.

Beyond the above-described cases of general purpose application described in the exemplary embodiment, a telecommunications exchange system outfitted according to the invention can also be configured for other specific applications i.e., branch or line of business approaches communication systems. For example, a computer PC can be used for ordering, in which case, e.g., for filling up of stocks or supplies, the computer PC can automatically initiate a call connection between the ordering place and a preassigned location. Another possibility is personnel time recording, where, for example, the presence of persons is not only registered in time by the computer PC without collaboration of the telecommunications exchange system but the time of presence of the subscriber can be communicated to the customer data memory in the memory SP. In this case, no manual inputting of change data via the input keyboard of a terminal device is preferably necessary; rather, the required data are input automatically by recording devices provided for this purpose which are connected to the computer PC. Conversely, it is also conceivable to perform personnel time recording via the terminal devices and to enter the presence data in the customer data memory in the memory SP. The administration of the personnel time data can the take place via a computer PC to which the data to be matched have been communicated by the group control device GST and the next level control device ST.

Another case of application is seen in the hospitals in which a computer PC is used as a central registration and control device for the use of television sets in patients' rooms. In this case, usage data can provisionally be held in the customer data memory in the memory SP, since the use of a television set and the choice of programs is accomplished with the aid of digits that are dialed into the corresponding terminal device. A first selection identification can serve to identify the use of the television set, while a further identification can regard the choice of channel. This information is transmitted to the computer PC so that the latter, by the measures described herein, causes a remotely controlled device located in the patient's room to be addressed which activated the attached television set whereby the desired channel is selected and earphones are linked to the television set to be connected to the electroacoustic transducer of the patient in question who, with the aid of the terminal device, has initiated the use of the television set.

Another case of application is seen in the handling of emergency calls, in which emergency call reports are registered on a display or indicator connected to a computer and are evaluated in order subsequently to cause an addressed connection to be formed with one or more preassigned connections automatically. The connections are made on the basis of a call-up list stored in the computer PC, certain connections being selected and automatically initiating an emergency call or alarm report depending on the different emergency calls or alarms provided.

In this table, all momentarily active computers PC are noted in the accessory control device HS, the contents of this table being communicated to all computers PC in the case of a change in data.

To relieve the burden on the accessory control device HS, part of the functions of the accessory control device HS described can be transferred into a computer PC which can be identified as the "master" with respect to the other computers PC. If this computer PC is not active, then its "master" function is taken over in turn by the accessory control device HS or also by another active computer PC.

We claim:

1. A digital telecommunications exchange system with a control device having a memory, and with a large number of termination circuits for making operative connections via subscribers' lines including at least one of connection lines for terminal devices and line circuits for additional exchange systems, the subscribers' lines in each case having at least two user channels and one data/signalling channel, information on the user channels being transmitted between the connection lines and a coupling device of the telecommunications exchange system, and information on the data/signalling channel being carried between said subscribers' lines and the control device via a bus system, the telecommunications exchange system comprising:

a data memory;

at lest one computer coupled to one of the connection lines, the computer having a computer memory; and, an accessory control device associated with said control device, and means to transmit data between the computer and the control device, for effecting data transmission in at least one direction between the computer and the data memory, and wherein changes in contents of said data memory are monitored by the accessory control device, the accessory control device including a table of information as to correspondence between data in the data memory and at least one of data int he computer memory and other data in the data memory, whereby changes to the data memory are likewise effected in corresponding contents of at least one of the data memory and the computer memory.

2. The digital telecommunications exchange system of claim 1, wherein said computer while active is arranged to regularly send a report of its operating state to the accessory control device for recording.

3. The digital telecommunications exchange system of claim 1, wherein the table of the accessory control device is updated to contain information identifying data in the memory associated with the control device which has been changed, and identifying data as to the particular computer initiating the change.

4. The digital telecommunications exchange system of claim 3, further comprising means for amending data in at least one additional said computer identified in the table of the accessory control device as having data corresponding to the data which has been changed.

5. The digital telecommunications exchange system of claim 1, wherein exchange of data between the computer and the control device takes place via the data/signalling channel.

6. The digital telecommunications exchange system of claim 1, comprising at least two computers on the exchange system, the computers being operable to exchange data under control of the accessory control device, formation of a connection between said computers taking place on the basis of information from the accessory control device and transmission of the data taking place via at least one of the user channels.

7. The digital telecommunications exchange system of claim 1, comprising a plurality of computers connected to the exchange system and wherein access by the computers to the memory of the control device is controlled by the accessory control device.

8. The digital telecommunications exchange system of claim 1, wherein changes in the data in the memory of the control device are also possible by additional terminal devices connected to the telecommunications exchange system and authorized to make said changes.

9. The digital telecommunications exchange system of claim 1, wherein the accessory control device forms a part of the control device.

10. The digital telecommunications exchange system of claim 1, wherein a plurality of accessory control devices are provided which are activated by items of information on at least one of the data channel and the signalling channel.

11. The digital telecommunications exchange system of claim 1, wherein the table in the accessory control device contains information on active computers on the exchange system.

12. The digital telecommunications exchange system of claim 1, wherein data matching takes place between the accessory control device and one of a plurality of computers on the exchange system, and wherein corresponding data matching is accomplished with others of the computers by data transmission occurs via at least one of the user channels.

13. The digital telecommunications exchange system of claim 1, wherein functions of the accessory control devices are stored in a certain active computer.

14. The digital telecommunications exchange system of claim 13, wherein in that in the event of an outage of said active computer, said functions are assumed by one of the accessory control device and another active computer.

15. A digital telecommunications exchange system with a control device having a memory, the telecommunications exchange system having a large number of connection circuits for making operative connections between at least two of a plurality of terminal devices including one of terminals and exchange systems, via communication lines in each case having at least two user channels and one data/signalling channel, information on the user channels being transmitted over connection lines between the terminal devices and a coupling device of the telecommunications exchange system, and information on the data/signalling channel being carried between the terminal devices and the control device via a bus system, for effecting addressed connections of the communication lines between the terminal devices, comprising:

an accessory control device associated with the control device, and wherein switching information intended for the control device and transmitted via the data/signalling channel is marked by a first indication code by one of said terminals and exchange devices, said information being processed in the control device of the telecommunications exchange system, and instead of the first indication code, a different special indication code being used by at least one of said terminals and exchange devices, respectively, which are authorized, and transmitted to the accessory control device, the accessory control device being operable to replace said different special indication code with the first indication code, whereupon the switching information is transmitted to the control device of the telecommunications exchange system for effecting a desired function.

16. The digital telecommunications exchange system of claim 15, wherein the first indication code includes information for effecting a connection between terminal devices on the exchange system and the different special indication code authorizes a change in memory data initiated by one of the terminal devices.

17. The digital telecommunications exchange system of claim 16, wherein said change in memory is communicated in turn to additional ones of the terminal devices identified by a able in memory including addresses of the additional terminal devices where data corresponding to the changed memory data is stored.

18. The digital telecommunications exchange system of claim 15, wherein the first indication code is interpreted by the control device for effecting a connection between terminal devices, and for an authorized transmission the different special indication code is interpreted by the control device of passing a transmission to the accessory control device, the accessory control device inserting the first indication code in place of the different special indication code if the terminal is authorized, and returning the transmission to the control device, whereupon a connection for the authorized transmission is effected.

19. The digital telecommunications exchange system of claim 18, wherein the authorized transmission operates a special function appended to the telecommunications system, said special function being initiated, authorized and effected using connections of the exchange system otherwise employed for routine transmission of data between terminal devices.

* * * * *